(No Model.)
L. D. CRAIG.
BICYCLE ALARM.
No. 556,459. Patented Mar. 17, 1896.
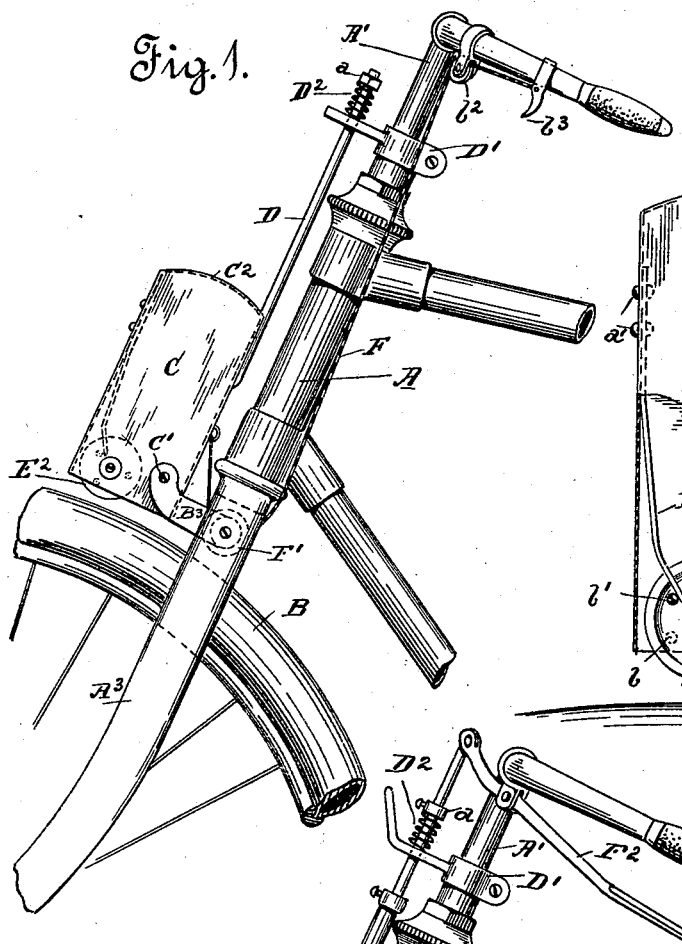
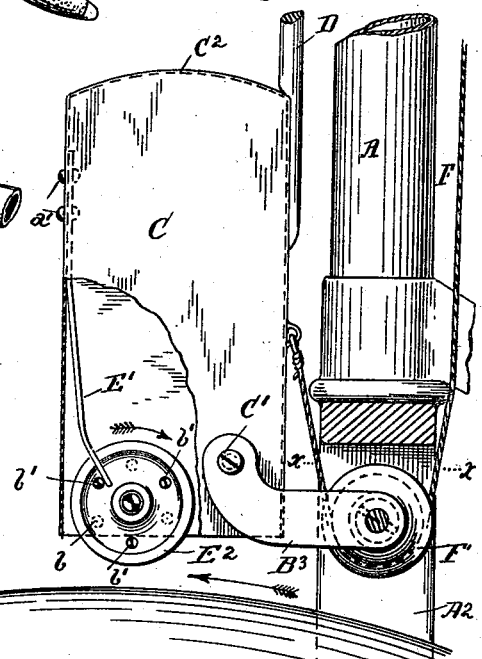
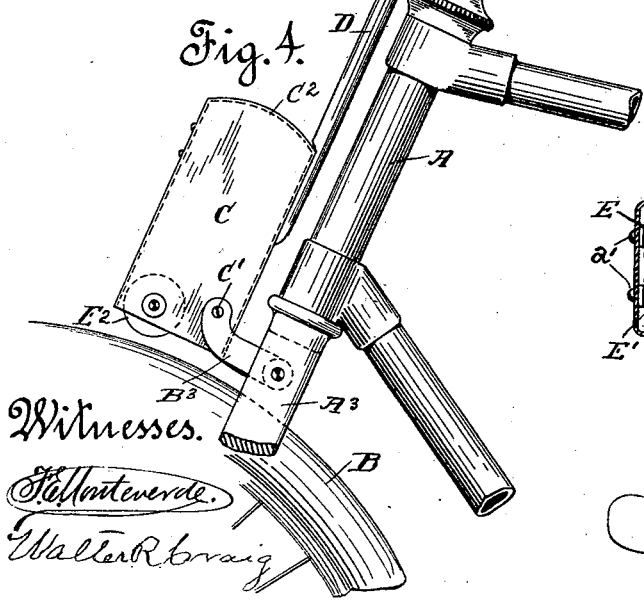
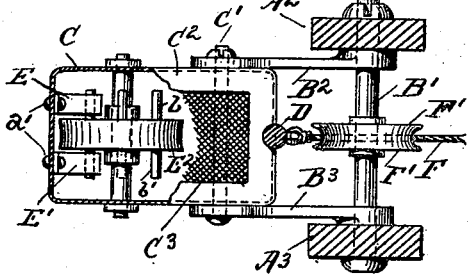

UNITED STATES PATENT OFFICE.

LEE D. CRAIG, OF SAN FRANCISCO, CALIFORNIA.

BICYCLE-ALARM.

SPECIFICATION forming part of Letters Patent No. 556,459, dated March 17, 1896.

Application filed September 14, 1895. Serial No. 562,553. (No model.)

*To all whom it may concern:*

Be it known that I, LEE D. CRAIG, a citizen of the United States, residing at San Francisco, in the county of San Francisco and State of California, have invented certain new and useful Improvements in Vehicle Alarm-Signals; and I do hereby declare that the following is a full, clear, and exact description thereof.

This invention relates to a certain new and useful alarm attachment for vehicles, it being more especially designed for use in connection with bicycles or other light-running vehicles.

The object of the invention is to provide a loud-sounding and simple and inexpensive alarm attachment for bicycles or other light-running vehicles, which may be readily controlled by the rider, so as to be operated by the wheel of the vehicle in order to notify pedestrians as to the approach of the vehicle, thus enabling the rider to dispense with the use of the bell or whistle now made use of for sounding an alarm.

In order fully to understand my invention, reference must be had to the accompanying sheet of drawings, forming a part of this application, wherein—

Figure 1 is a side view in elevation, showing a portion of a bicycle with my alarm attachment connected thereto. Fig. 2 is an enlarged detail view in side elevation, partly broken away, of the alarm attachment. Fig. 3 is a top plan view, partly broken away, of the mechanism illustrated by Fig. 2, the fork of the bicycle being on line $x\ x$, Fig. 2; and Fig. 4 is a view similar to Fig. 1, showing the alarm attachment connected to a fulcrumed hand-lever.

In the drawings, the letter A is used to indicate the head of a bicycle, and A' the handle-bar post. Through the arms $A^2\ A^3$ or fork portion of the head above the periphery of the wheel B extends the shaft B', which shaft supports the forwardly-extending arms $B^2\ B^3$. These arms are connected at their forward end to the hollow metallic box or casing C by means of the transverse bolt C'. This metallic box or casing is arranged in advance of the bicycle-head, as shown in the drawings, and constitutes what I shall hereinafter term the "sound-casing." By preference the said sound-casing is constructed with closed sides and open top, the top $C^2$ having an opening cut therein, which is covered by a screen $C^3$ of wire-cloth. My object in providing the top $C^2$ is to give strength to the hollow sound-casing. From the said sound-casing upwardly projects the rod D, which extends through a guide-opening cut through the guide-bracket D', which is secured to and projects forwardly from the handle-bar post A'. Upon the projecting end of the rod D is secured the spiral spring $D^2$, which is held in place by the nut $a$. The resiliency of this spring serves to hold the rod D in its raised position in order to maintain the sound-casing C above the periphery of the bicycle-wheel B.

Within the sound-casing are located and secured two metallic spring-strips E E', the lower end of each of which strips is free, while the upper end of each strip is secured to the inner face of the sound-casing by the rivets $a'$, or otherwise. These metallic spring-strips extend to nearly the bottom of the sound-casing and embrace the roll $E^2$, journaled in the bottom of said sound-casing, Figs. 2 and 3. The lower edge or portion of the roll $E^2$ extends beyond the lower edge of the sound-casing, as shown. From the roll $E^2$ laterally extend a series of lugs or pins $b$ $b'$, which engage with the lower end of the metallic spring-strips E E', as the roll $E^2$ rotates, as hereinafter described.

From the sound-casing extends the cord F, which is run under the wheel F', secured to the shaft B', and thence up to the handle-bar $F^2$ over the pulley $b^2$ and is connected to the finger-piece $b^3$, Fig. 1. However the cord connection may be dispensed with and the end of the rod D extended beyond the nut $a$ and secured to the end of the fulcrumed hand-lever $F^2$, Fig. 4.

In order to operate my device so as to sound an alarm the rider of the bicycle pulls upon the cord F or presses the fulcrumed hand-lever so as to move the sound-casing downward until the roll $E^2$ contacts with the periphery of the wheel B. When thus moved downward, the roll $E^2$ is rotated by frictional contact with the periphery of the bicycle-wheel B. During the rotation of the roll $E^2$ the pins or lugs $b\ b'$ engage the lower end of the metallic strips or clappers E E' and gradually move or draw the same away from the face of the sound casing or chamber. The moment the lugs or pins release the clappers E E' the spring thereof causes the same to suddenly fly outward and strike the wall of the sound casing or chamber. The rapidity with which the roll E² is rotated causes the clappers or metallic spring-strips to repeatedly strike against the wall of the sound casing or chamber in order to sound an alarm. The moment the operator releases the cord or fulcrumed hand-lever the resiliency of the spring D² will lift the sound casing or chamber so as to raise the roll E² clear of the wheel B.

The shape of the sound casing or chamber is immaterial; nor is it necessary that I make employment of two clappers or metallic spring-strips, for only one may be made use of if desired.

Having thus described my invention, what I claim as new, and desire to secure protection in by Letters Patent, is—

1. In an alarm attachment for bicycles or other vehicles, the combination with the hollow sound casing or chamber open at its top and bottom and movably secured to the vehicle, the clappers or striking-strips secured within the hollow sound casing or chamber, a rotatable device located within the lower portion of the said sound chamber or casing and which operates the clappers or striking-strips when the said rotatable device contacts with the wheel of the vehicle, and devices for lowering and raising the hollow sound casing or chamber.

2. In an alarm attachment for bicycles, the combination with the hollow sound casing or chamber movably secured to the bicycle in advance of the head thereof, the clappers or striking-strips secured to the inner wall of the sound casing or chamber, the roll journaled within the said casing or chamber so that a portion thereof projects below the lower edge of the casing or chamber, the pins or lugs laterally projecting from the said roll and which engage the free ends of the clappers or striking-strips as the said roll is rotated, the hand-operated mechanism for lowering the sound casing or chamber so as to place the roll in frictional contact with the wheel of the bicycle so as to sound an alarm, and of the spring-actuated rod for raising the said sound casing or chamber so as to raise the roll clear of the wheel after the sounding of an alarm.

3. In an alarm attachment for bicycles, the combination with the forwardly-extending arms movably secured to the fork of the bicycle, of the hollow sound casing or chamber open at its top and bottom and to which said arms are secured, the rod upwardly projecting from the said hollow sound casing or chamber, the guide-bracket projecting from the bicycle and through which the rod extends, a coiled spring for forcing the rod upward, the clappers or striking-strips located within the hollow sound casing or chamber, the roll journaled within the said casing or chamber, the lugs or pins laterally projecting from said roll and which engage with the clappers or striking-strips during the rotation of the roll, and of hand-operated mechanism for lowering the sound casing or chamber so as to place the roll in frictional contact with the bicycle-wheel so as to sound an alarm.

In testimony whereof I have affixed my signature, in presence of two witnesses, this 5th day of September, 1895.

LEE D. CRAIG.

Witnesses:
N. A. ACKER,
H. J. LANE.